(12) United States Patent
Jung et al.

(10) Patent No.: US 11,958,427 B2
(45) Date of Patent: Apr. 16, 2024

(54) AIRBAG SYSTEM

(71) Applicants: Hyundai Motor Company, Seoul (KR); Kia Corporation, Seoul (KR)

(72) Inventors: Jae Wung Jung, Bucheon-si (KR); Dong Hyun Ha, Seoul (KR); Jung Hun Choi, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/986,100

(22) Filed: Nov. 14, 2022

(65) Prior Publication Data
US 2024/0034261 A1 Feb. 1, 2024

(30) Foreign Application Priority Data
Jul. 29, 2022 (KR) .................... 10-2022-0094668

(51) Int. Cl.
*B60R 21/18* (2006.01)
(52) U.S. Cl.
CPC .................... *B60R 21/18* (2013.01)
(58) Field of Classification Search
CPC ....................................... B60R 21/18
See application file for complete search history.

(56) References Cited

U.S. PATENT DOCUMENTS

| | | | | |
|---|---|---|---|---|
| 5,288,104 A * | 2/1994 | Chen | ................ | B60R 21/18 280/806 |
| 5,456,491 A * | 10/1995 | Chen | ................ | B60R 21/18 280/729 |
| 2003/0001378 A1* | 1/2003 | Kim | ................ | B60R 21/231 280/801.1 |
| 2003/0038463 A1* | 2/2003 | Stonich | ................ | B60R 21/272 280/736 |
| 2009/0179406 A1* | 7/2009 | Haraoka | ................ | B60R 21/18 280/733 |
| 2009/0236828 A1* | 9/2009 | Foubert | ................ | B60R 21/18 280/733 |
| 2009/0236834 A1* | 9/2009 | Turner | ................ | B60R 21/23184 280/736 |
| 2010/0025972 A1* | 2/2010 | Nezaki | ................ | B60R 22/26 280/730.1 |
| 2015/0054263 A1* | 2/2015 | Renaudin | ................ | B60N 2/2812 280/728.2 |
| 2015/0069741 A1* | 3/2015 | Shimazu | ................ | B60R 21/233 280/729 |
| 2017/0050601 A1* | 2/2017 | Kobata | ................ | B60R 21/18 |
| 2017/0282832 A1* | 10/2017 | Kondo | ................ | B60R 21/262 |
| 2017/0282833 A1* | 10/2017 | Nagatsu | ................ | B60R 21/20 |
| 2018/0281725 A1* | 10/2018 | Nagasawa | ................ | B60R 21/207 |

(Continued)

FOREIGN PATENT DOCUMENTS

DE 102006003794 A1 * 7/2007 ............ B60R 21/18
DE 102018101317 A1 * 7/2018 ............ B60N 2/143
(Continued)

*Primary Examiner* — Nicole T Verley
(74) *Attorney, Agent, or Firm* — Morgan, Lewis & Bockius LLP

(57) ABSTRACT

An airbag system includes a seat belt; at least one airbag disposed in at least a portion of the seat belt; and an inflator connected to the at least one airbag and supplying gas to the airbag so that the airbag is inflatable.

12 Claims, 6 Drawing Sheets

(56) References Cited

U.S. PATENT DOCUMENTS

| | | | |
|---|---|---|---|
| 2019/0016288 A1* | 1/2019 | Schneider | B60R 21/18 |
| 2020/0254953 A1* | 8/2020 | Jessup | B60R 22/26 |
| 2020/0398781 A1* | 12/2020 | Faruque | B60R 21/231 |
| 2022/0297626 A1* | 9/2022 | Meador | B60R 21/231 |

FOREIGN PATENT DOCUMENTS

| | | | | |
|---|---|---|---|---|
| DE | 102017209417 A1 | * | 12/2018 | |
| DE | 102018117479 B3 | * | 7/2019 | |
| EP | 1016568 A1 | * | 7/2000 | ............ B60R 21/18 |
| EP | 1031472 A2 | * | 8/2000 | ............ B60R 21/18 |
| EP | 1101660 A1 | * | 5/2001 | ............ B60R 21/18 |
| EP | 1767410 A2 | * | 3/2007 | ............ B60R 21/18 |
| EP | 3696028 A1 | * | 8/2020 | ............ B60R 21/18 |
| JP | 2000142303 A | * | 5/2000 | |
| JP | 3352136 B2 | * | 12/2002 | |
| JP | 2008168775 A | * | 7/2008 | |
| JP | 2009166569 A | * | 7/2009 | ............ B60R 21/18 |
| JP | 4380778 B1 | * | 12/2009 | ............ B60N 2/688 |
| JP | 2017178240 A | * | 10/2017 | |
| JP | 2017178241 A | * | 10/2017 | ............ B60R 21/18 |
| JP | 2017222364 A | * | 12/2017 | ............ B60R 21/18 |
| KR | 20230036577 A | * | 3/2023 | |
| WO | WO-9912776 A1 | * | 3/1999 | ........ B60R 21/2646 |
| WO | WO-0168412 A1 | * | 9/2001 | ............ B60R 21/18 |
| WO | WO-03072401 A1 | * | 9/2003 | ............ B60R 21/18 |
| WO | WO-2007069396 A1 | * | 6/2007 | ............ B60R 21/18 |
| WO | WO-2009155534 A1 | * | 12/2009 | ............ B60R 21/18 |
| WO | WO-2013013181 A2 | * | 1/2013 | ............ B60N 2/002 |
| WO | WO-2013107951 A1 | * | 7/2013 | ............ B60R 21/18 |

\* cited by examiner

AIRBAG SYSTEM

CROSS-REFERENCE TO RELATED APPLICATION

The present application claims priority to Korean Patent Application No. 10-2022-0094668, filed on Jul. 29, 2022, the entire contents of which is incorporated herein for all purposes by this reference.

BACKGROUND OF THE PRESENT DISCLOSURE

Field of the Present Disclosure

The present disclosure relates to an airbag system.

Description of Related Art

The content described in the present section merely provides the background information on the present disclosure and does not form the prior art.

An airbag system provided in a vehicle is configured so that gas (e.g., nitrogen) generated using an ignition agent and a gas generating agent by an inflator including a housing, an ignitor, and a filter passes through the filter and then fills a specific space, and the filled gas is supplied to an airbag, thus inflating and deploying the airbag.

In a conventional airbag system, a plurality of airbags are disposed at fixed positions such as a front and sides inside the vehicle. In the event of a vehicle collision, the airbag disposed at the fixed position is inflated to prevent a passenger separated from a vehicle seat from colliding with a windshield or a side frame of the vehicle, thus protecting the passenger.

However, the conventional airbag system is problematic in that the plurality of airbags are disposed at the fixed positions inside the vehicle, so that it is difficult to effectively protect a passenger depending on a passenger's posture, position and various collision situations. Because a swivel seat or the like is applied to a fully autonomous vehicle to provide various postures and positions of a passenger, it is necessary to effectively protect a passenger according to the passenger's postures and positions. Furthermore, it is necessary to protect important body parts such as a passenger's head or neck in the event of a collision situation, thus ensuring the safety of the passenger.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an airbag system including: a seat belt; at least one airbag disposed in at least a portion of the seat belt; and an inflator connected to the at least one airbag and supplying gas to the airbag so that the airbag is inflatable.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
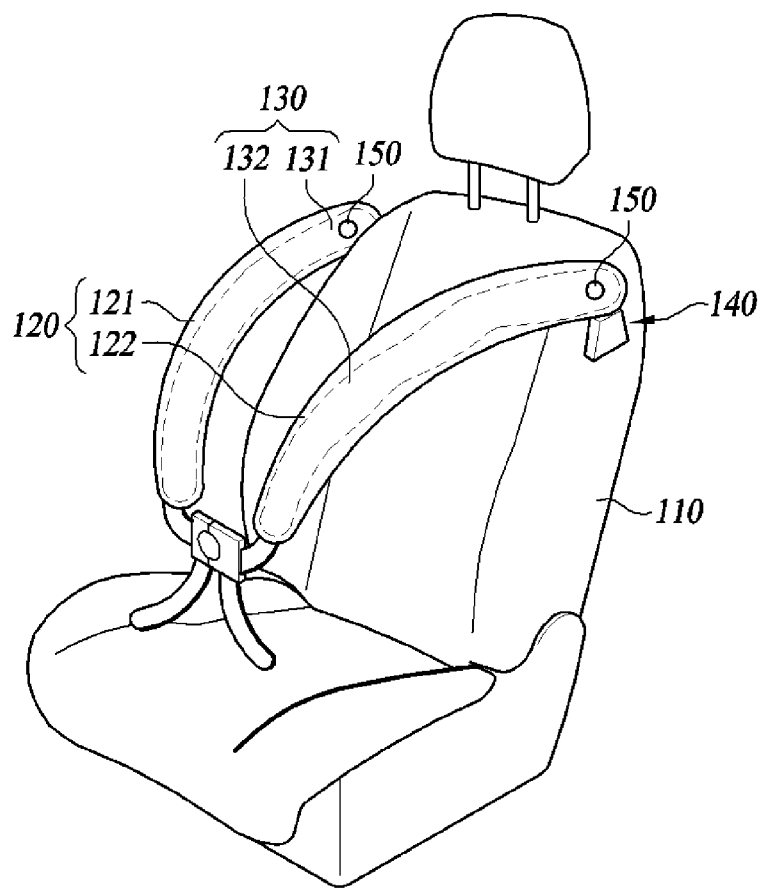
FIG. 1 is a perspective view exemplarily illustrating an airbag system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

An airbag system according to an exemplary embodiment can effectively protect a passenger depending on a passenger's posture, position or various collision situations, using an airbag disposed in a seat belt.

An airbag system according to an exemplary embodiment can effectively protect a whole body of a passenger as well as the head and the neck, which are important parts of the body, using an airbag disposed in a seat belt.

The problems to be solved by the present disclosure are not limited to the above-mentioned problems, and other problems which are not mentioned will be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Furthermore, in the following description of various exemplary embodiments of the present disclosure, a detailed description of known functions and configurations incorporated therein will be omitted for clarity and for brevity.

Additionally, various terms such as first, second, A, B, (a), (b), etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a perspective view exemplarily illustrating an airbag system according to an exemplary embodiment of the present disclosure.

Figure 2:
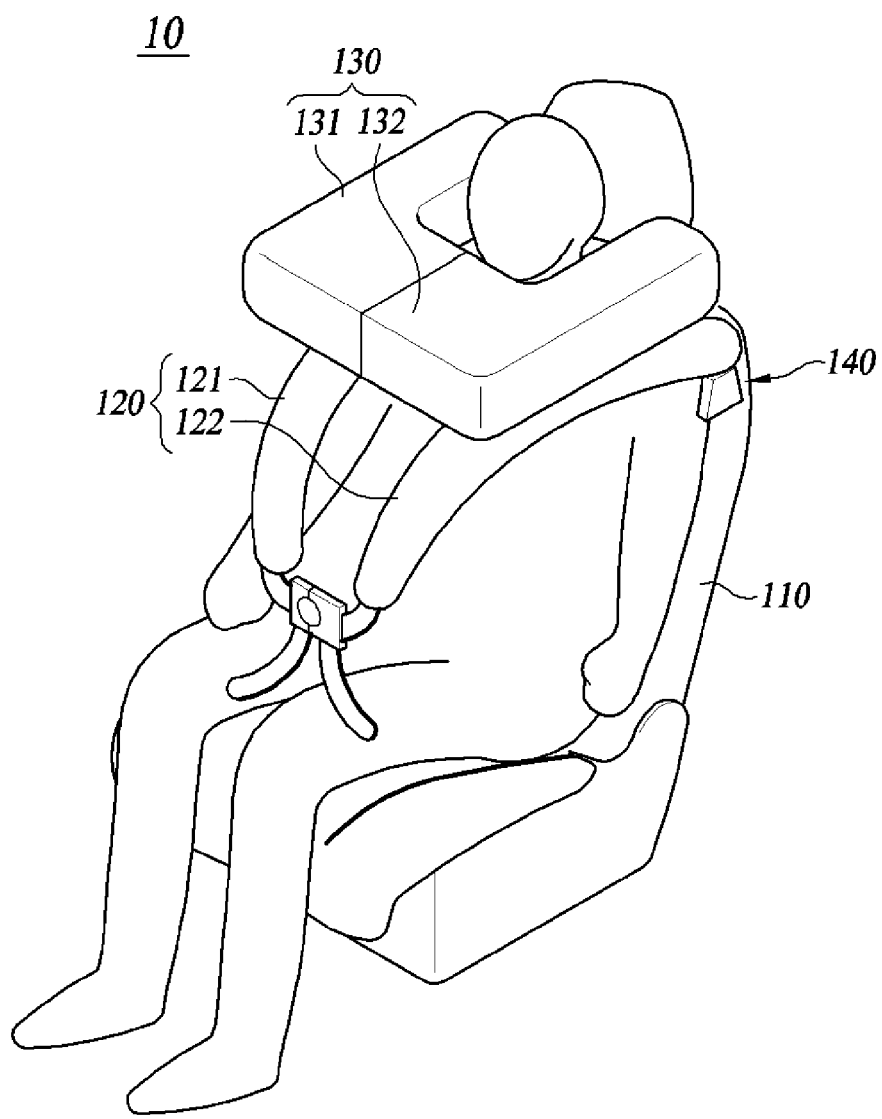
FIG. 2 is a diagram illustrating an airbag deployed in the airbag system according to an exemplary embodiment of the present disclosure.

FIG. 2 is a diagram illustrating an airbag deployed in the airbag system according to an exemplary embodiment of the present disclosure.

Referring to FIG. 1 and FIG. 2, the airbag system 10 according to an exemplary embodiment of the present disclosure includes all or some of a seat 110, a seat belt 120, an airbag 130, an inflator 140, and a control unit.

The seat 110 is configured so that a passenger of a vehicle may sit thereon. At least a portion of the seat belt 120 may be connected to the seat 110. When the seat belt 120 is connected to the seat 110, an inflator 140 may be connected together at a portion where the seat 110 and the seat belt 120 are connected. The inflator 140 may be disposed on an internal rear surface of the seat 110. The seat 110 according to an exemplary embodiment of the present disclosure may be a swivel seat which is applicable to a fully autonomous vehicle or the like, but is not necessarily limited thereto.

The seat belt 120 is configured to protect the passenger of the vehicle. The seat belt 120 may be configured to surround at least a portion of a passenger's body. The airbag 130 is disposed in at least a portion of the seat belt 120 of the airbag system 10 according to an exemplary embodiment of the present disclosure. The airbag 130 may be disposed in the seat belt 120.

The seat belt 120 may include a first shoulder portion 121 which is configured to surround at least a portion of one shoulder of a passenger, and a second shoulder portion 122 which is configured to surround at least a portion of the other shoulder of the passenger. The airbag 130 may be disposed in each of the first shoulder portion 121 and the second shoulder portion 122. As the airbag 130 is disposed in the seat belt 120 surrounding a passenger's body, the airbag 130 is coupled with a passenger's body to move together even if the passenger's position, posture or the like is changed, actively protecting the passenger. Furthermore, as the airbag 130 is disposed in the first shoulder portion 121 and the second shoulder portion 122 surrounding the passenger's shoulder, important body parts of the passenger, such as the head or the neck, may be protected in the event of a vehicle collision, thus effectively ensuring the safety of the passenger.

When the airbag 130 is disposed in the seat belt 120, at least a portion of the seat belt 120 may be configured to be opened, thus allowing the airbag 130 to be deployed from the inside to the outside of the seat belt 120. For example, at least a portion of the seat belt 120 may be sealed. Thus, the airbag 130 is safely stored in the seat belt 120 at normal times. Only when a collision situation occurs, only the sealed portion is torn and the airbag 130 is deployed from the inside to the outside of the seat belt 120, thus protecting a passenger.

Furthermore, when the airbag 130 is disposed in the seat belt 120, an opening 150 may be formed in at least a portion of the seat belt 120 to allow the airbag 130 to be deployed from the inside to the outside of the seat belt 120. Unlike the above-described sealed portion, the opening 150 may be formed in the shape of a hole. As gas is fed from the inflator 140 to the airbag 130, the airbag 130 may pass through the opening 150 and then be deployed to the outside of the seat belt 120.

However, a structure in which the airbag 130 is deployed from the inside to the outside of the seat belt 120 is not limited to the above-described structure. It should be noted that the airbag 130 may be deployed in other structures according to the purpose and use.

The airbag 130 is configured to be inflated and deployed by gas which is fed from the inflator 140. The airbag 130 according to an exemplary embodiment of the present disclosure may be disposed in at least a portion of the seat belt 120, especially the inside thereof. As described above, as the airbag 130 is disposed in the seat belt 120, the airbag 130 is coupled with a passenger's body to move together even when the passenger's posture or position is changed or under various collision situations, thereby being capable of effectively protecting the passenger, unlike the conventional airbag which is deployed only at a fixed position.

The airbag 130 may be disposed on a portion of the seat belt 120 that surrounds a passenger's shoulder. To be more specific, the airbag 130 may include a first airbag 131 disposed on the first shoulder portion 121 of the seat belt 120, and a second airbag 132 disposed on the second shoulder portion 122. As the airbag 130 is disposed on the first shoulder portion 121 and the second shoulder portion 122, the airbag can protect important body parts such as a passenger's head or neck in the event of a collision situation, thus effectively ensuring the safety of the passenger.

In the event of a vehicle collision, the airbag 130 may be deployed from the inside to the outside of the seat belt 120 to protect a passenger. At the instant time, the airbag 130 may be deployed by tearing a sealed portion of the seat belt 120, or be deployed from the inside to the outside of the seat belt 120 by passing through the opening which is provided in a portion of the seat belt 120.

As shown in FIG. 2, the airbag 130 according to an exemplary embodiment of the present disclosure may have a shape deployed to surround a passenger's head and neck. Thus, the passenger may be effectively protected even when the passenger's posture or position is changed and in various collision situations. To be more specific, as the deployment shape of the airbag 130 is configured to surround the passenger's head and neck, the passenger's body, particularly, the head and the neck that are important body parts can be effectively protected even in various situations, such as a frontal collision, a side collision or a rear collision of a vehicle. Furthermore, in a fully autonomous vehicle, when passengers of the vehicle move while facing each other, it is possible to prevent the passengers separated from the seat 110 from colliding with each other in the event of a collision situation. Even when the passenger moves in a lying state by reclining the seat 110, it is possible to prevent a passenger from being separated from the seat 110 in the event of a collision situation, and to protect a passenger's body. Even when a passenger sits in a swivel seat or the like which may be applied to the fully autonomous vehicle at an angle which is different from the driving direction of the vehicle, the airbag may restrain a passenger in the event of a collision situation, thus preventing the passenger from being separated from the seat 110, and protecting the passenger's body. Accordingly, the airbag system 10 according to an exemplary embodiment of the present disclosure can stably restrain the passenger in the seat 110 even when a passenger's posture, position, or angle is changed and in various collision scenarios, and can protect a whole body of a passenger as well as the head and the neck, which are important parts of the body, thus more effectively ensuring the safety of the passenger.

Figure 3A:
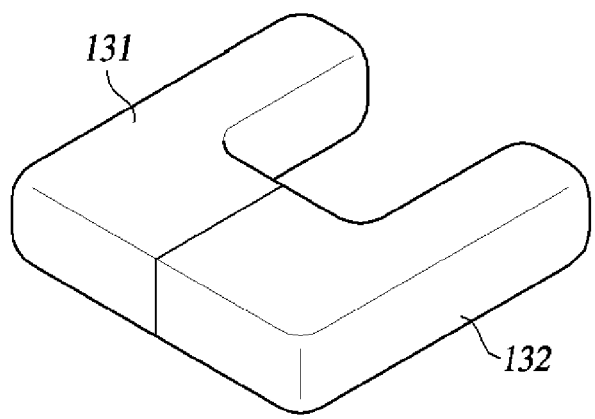
FIG. 3A, FIG. 3B and FIG. 3C are diagrams illustrating various deployment shapes of the airbag according to an exemplary embodiment of the present disclosure.
Figure 3B:
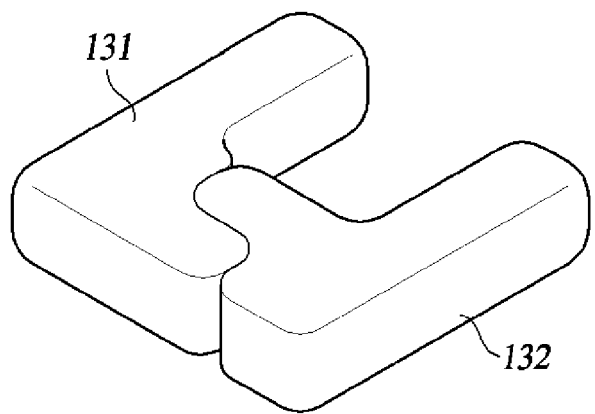
Figure 3C:
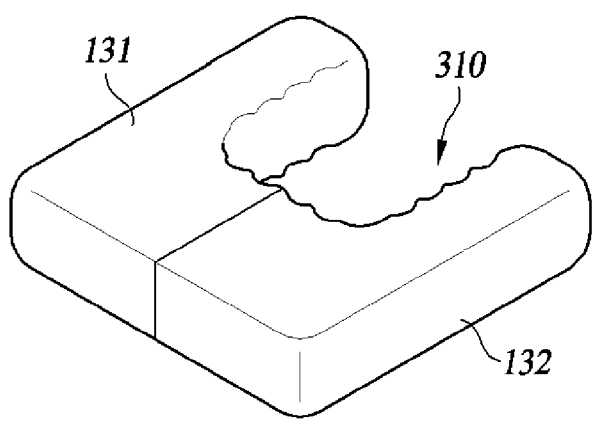

FIG. 3A, FIG. 3B and FIG. 3C are diagrams illustrating various deployment shapes of the airbag according to an exemplary embodiment of the present disclosure.

The airbag 130 according to an exemplary embodiment of the present disclosure may have various deployment shapes to effectively protect a passenger. Various deployment shapes of the airbag 130 will be described in detail with reference to FIGS. 3A, 3B and 3C.

As shown in FIG. 3A, the deployment shape of the airbag 130 may be a shape in which the first airbag 131 and the second airbag 132 are symmetrical with respect to a passenger. As the airbag 130 is formed in the symmetrical shape, a phenomenon such as catching which may occur during the deployment of the airbag 130 is prevented, so that the airbag 130 may be smoothly deployed. Furthermore, as the deployment shape of the airbag 130 has the symmetrical shape with respect to the passenger, the left and right sides of the body may be equally protected while keeping the balance of the passenger's body.

As shown in FIG. 3B, the deployment shape of the airbag 130 may be a shape in which at least a portion of the first airbag 131 and at least a portion of the second airbag 132 are interlocked, for example, a shape in which puzzle pieces are combined with each other. Thus, even when a collision situation occurs, the first airbag 131 and the second airbag 132 are securely coupled to each other, so that it is possible to more stably support a passenger's body.

As shown in FIG. 3C, a suffocation preventing portion 310 may be formed on a portion of the airbag 130. The suffocation preventing portion 310 may be formed on a portion adjacent to a passenger's face based on a shape in which the airbag 130 is deployed. Thus, even when the airbag 130 is deployed, a passenger may breathe smoothly. In the case of infants or the old and weak, the ability to breathe may be relatively insufficient compared to the general public. Even in the instant case, a passenger can breathe smoothly, thus preventing suffocation caused by the deployment of the airbag 130. As shown in FIG. 3C, the suffocation preventing portion 310 may be implemented in a form of a bend or a gap.

The deployment shape of the airbag 130 according to an exemplary embodiment of the present disclosure is not limited to the above-described shape. It may be noted that the airbag 130 may be formed in other shapes according to the purpose and use to protect a passenger.

The inflator 140 according to an exemplary embodiment of the present disclosure will be described with reference to FIG. 1 and FIG. 2.

The inflator 140 is configured to supply gas to the airbag 130. The inflator 140 is connected to the airbag 130 to supply gas to the airbag 130. When the seat 110 and the seat belt 120 of the vehicle are connected to each other, the inflator 140 may be connected to the airbag 130 at a portion where the seat 110 and the seat belt 120 are connected, thus supplying gas to the airbag 130. In the case of having a plurality of airbags 130, one inflator 140 may supply gas to all of the plurality of airbags 130, but the plurality of inflators 140 may supply gas to the airbags 130, respectively, thus allowing gas to be smoothly and rapidly supplied to the airbags 130. Therefore, the airbags 130 may be rapidly deployed to effectively protect a passenger.

The inflator 140 may be disposed on the inside of the seat 110, especially the rear surface of the inside to minimize noise (e.g., noise caused by ignition for operating the airbag) transmitted to a passenger and thereby prevent the passenger's hearing from being damaged.

The inflator 140 may be tilted at a predetermined angle so that gas is smoothly and rapidly fed from the inflator 140 to the airbag 130 and thereby the airbag 130 is rapidly deployed. Here, an angle at which the inflator 140 is arranged may be optimized and determined based on the size of the vehicle, the size of the seat 110, the installation angle of the seat 110, and the arrangement angle of the seat belt 120. Furthermore, the arrangement angle of the inflator 140 is adjustable so that gas is supplied to the airbag 130 under optimum conditions according to the body condition of a passenger, the size of the vehicle, the size of the seat 110, the installation angle of the seat 110, and the arrangement angle of the seat belt 120.

The inflator 140 may include a communication module, an initiator, and an air hole. The inflator 140 may communicate with the control unit of the vehicle or the control unit of the airbag system 10 using the communication module to receive information related to whether a vehicle collision accident or the like has occurred. When the collision accident or the like occurs, the inflator 140 may supply gas to the airbag 130 by opening the air hole and operating the initiator.

Figure 4:
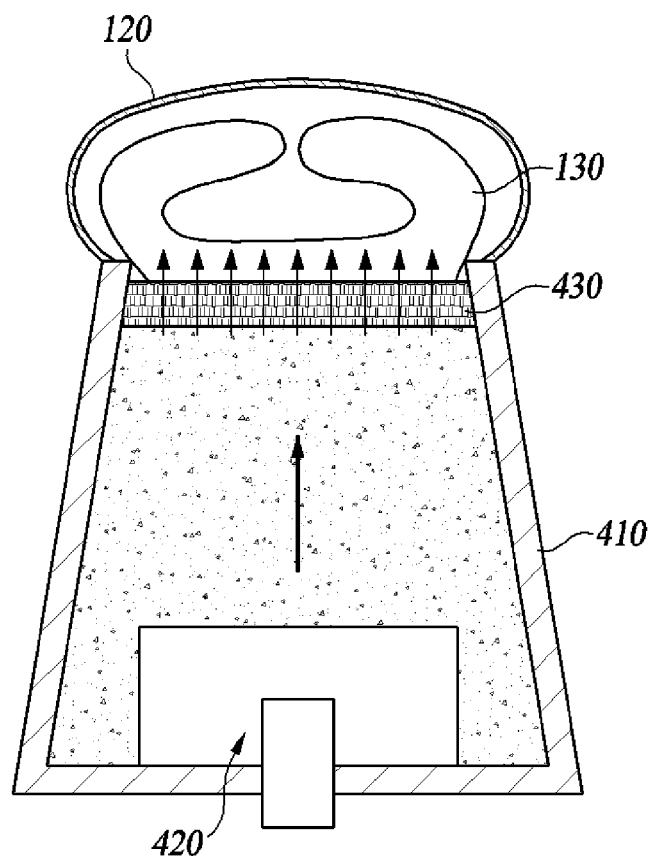
FIG. 4 is a diagram illustrating the structure of an inflator according to an exemplary embodiment of the present disclosure.

FIG. 4 is a diagram illustrating the structure of the inflator according to an exemplary embodiment of the present disclosure.

Referring to FIG. 4, the inflator 140 according to an exemplary embodiment of the present disclosure may be formed in a direct coupling structure so that gas generated by the inflator 140 is directly fed from the inflator 140 to the airbag 130, unlike a structure in which gas generated by a conventional inflator is filled in a specific space and then supplied to the airbag. This allows the airbag 130 to be more rapidly deployed in the event of a collision situation, thus protecting a passenger. To be more specific, the inflator 140 may include a housing 410 defining an accommodation space therein, an ignitor 420 disposed on one side of the housing 410, and a filter 430 disposed on the other side of the housing 410. In the housing 410, not only the ignitor 420 and the filter 430 but also a gas generating agent and an ignition agent may be disposed. If the ignitor 420 generates sparks using the ignition agent, gas such as nitrogen is generated by the gas generating agent inside the housing 410, and the generated gas passes through the filter 430. The airbag 130 may be connected to the other side of the housing 410 to be adjacent to the filter 430. Thus, gas generated from one side of the housing 410 may be directly supplied to the airbag 130 via the filter 430 disposed on the other side of the housing, thus allowing the airbag 130 to be rapidly deployed.

At least a portion of the inflator 140, e.g., the housing 410 may be formed in a shape (e.g., a triangle, a diamond, a trapezoid, etc.) in which a sectional area thereof is gradually reduced in a direction from one side to the other side thereof. Thus, the moving speed of gas generated in the inflator 140 may be gradually increased in a direction from the inflator 140 to the airbag 130. However, the shape of the inflator 140 is not necessarily limited thereto, and the inflator may have other shapes in which gas is directly supplied from the inflator 140 to the airbag 130.

According to an exemplary embodiment of the present disclosure, an airbag system can effectively protect a passenger depending on a passenger's posture, position or various collision situations, using an airbag disposed in a seat belt.

According to an exemplary embodiment of the present disclosure, an airbag system can effectively protect a whole body of a passenger as well as the head and the neck, which are important parts of the body, using an airbag disposed in a seat belt.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code that may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An airbag system comprising:
   a seat belt;
   a plurality of air bags disposed in at least a portion of the seat belt; and
   an inflator connected to the plurality of air bags and supplying gas to the plurality of air bags so that the plurality of air bags is inflatable,
   wherein a deployment shape of the plurality of airbags is a shape in which at least a portion of each of the plurality of airbags is directly interlocked with each other, and
   wherein the deployment shape of the plurality of airbags is a shape in which puzzle pieces are directly combined with each other.

2. The airbag system of claim 1, wherein the plurality of air bags is mounted in the seat belt.

3. The airbag system of claim 2, wherein at least a portion of the seat belt is configured to be opened, thus allowing the plurality of air bags to be deployed from an inside to an outside of the seat belt by the supplied gas.

4. The airbag system of claim 3, wherein at least a portion of the seat belt is sealed.

5. The airbag system of claim 1, wherein the seat belt includes:
   a first shoulder portion configured to surround at least a portion of one shoulder of a passenger in a vehicle; and
   a second shoulder portion configured to surround at least a portion of the other shoulder of the passenger,
   wherein the plurality of air bags includes:
   a first airbag mounted on the first shoulder portion; and
   a second airbag mounted on the second shoulder portion.

6. The airbag system of claim 5, wherein a deployment shape of the plurality of air bags is a shape in which at least a portion of the first airbag and at least a portion of the second airbag are interlocked with each other.

7. The airbag system of claim 2, wherein an opening is formed in at least a portion of the seat belt to allow the plurality of air bags to be deployed from the inside to the outside of the seat belt by the supplied gas.

8. The airbag system of claim 1, wherein the deployment shape of the plurality of air bags is a shape in which at least a portion of one or more of the passenger's head and neck is surrounded by the plurality of air bags.

9. The airbag system of claim 1, wherein a suffocation preventing portion is formed on at least a portion of the plurality of air bags.

10. The airbag system of claim 1, wherein the inflator is disposed on a rear surface of inside of a seat of the vehicle.

11. The airbag system of claim 1, wherein the inflator is disposed to be tilted at a predetermined angle.

12. The airbag system of claim 1, wherein the inflator is formed in a direct coupling structure so that the gas is directly fed from the inflator to the plurality of air bags.

\* \* \* \* \*